United States Patent
Marchini et al.

(10) Patent No.: US 9,649,818 B2
(45) Date of Patent: *May 16, 2017

(54) PROCESS AND APPARATUS FOR BUILDING TYRES

(75) Inventors: Maurizio Marchini, Milan (IT); Gaetano Lo Presti, Milan (IT); Gianni Mancini, Milan (IT); Pierangelo Misani, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 981 days.

This patent is subject to a terminal disclaimer.

(21) Appl. No.: 12/994,711

(22) PCT Filed: May 28, 2008

(86) PCT No.: PCT/IT2008/000355
§ 371 (c)(1),
(2), (4) Date: Nov. 24, 2010

(87) PCT Pub. No.: WO2009/144753
PCT Pub. Date: Dec. 3, 2009

(65) Prior Publication Data
US 2011/0072664 A1    Mar. 31, 2011

(51) Int. Cl.
*B29D 30/24* (2006.01)
*B29D 30/32* (2006.01)
*B29D 30/72* (2006.01)

(52) U.S. Cl.
CPC ......... *B29D 30/244* (2013.01); *B29D 30/245* (2013.01); *B29D 30/32* (2013.01);
(Continued)

(58) Field of Classification Search
CPC .... B29D 30/244; B29D 30/245; B29D 30/32; B29D 30/72; B29D 30/3021; B29D 30/3028; B29D 2030/3214
(Continued)

(56) References Cited

U.S. PATENT DOCUMENTS 1,524,467 A     1/1925 Abbott, Jr.
1,756,327 A *  4/1930 Allensworth .......... B29D 30/32
                                                 156/403
(Continued)

FOREIGN PATENT DOCUMENTS

CN      1133231 A    10/1996
EP      0 780 220 A2  6/1997
(Continued)

OTHER PUBLICATIONS

Notification of the First Office Action issued Oct. 30, 2012 by State Intellectual Property Office of the People's Republic of China in corresponding Application No. CN 200880129458.X (7 pages).
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A carcass ply is applied around an outer surface of a building drum according to an application diameter larger than the fitting diameter of a tire. Coaxially engaged around each of the end flaps is an annular anchoring structure defining the fitting diameter. A pair of sidewalls is manufactured by laying of a continuous elongated element in the form of approached coils on the carcass sleeve. An outer sleeve, including at least one belt structure possibly associated with a tread band, is coaxially centered around the carcass sleeve. Through axial approaching of two halves forming the building drum, the carcass sleeve is shaped into a toroidal configuration to determine application of same against a radially internal surface of the outer sleeve.

21 Claims, 5 Drawing Sheets

(52) U.S. Cl.
CPC ...... *B29D 30/72* (2013.01); *B29D 2030/3214* (2013.01); *Y10T 29/49492* (2015.01); *Y10T 29/53448* (2015.01)

(58) Field of Classification Search
USPC .............. 156/117, 397, 130, 130.7, 131–133
See application file for complete search history.

(56) References Cited

U.S. PATENT DOCUMENTS

| | | | |
|---|---|---|---|
| 1,871,604 A * | 8/1932 | Graham | B29D 30/32 156/403 |
| 2,045,545 A | 6/1936 | Shook | |
| 2,319,643 A * | 5/1943 | Sternad | B29D 30/248 156/396 |
| 2,818,907 A * | 1/1958 | Sapp | 156/396 |
| 3,032,093 A | 5/1962 | Nebout | |
| 3,276,930 A * | 10/1966 | Keefe, Jr. | 156/130 |
| 3,510,375 A | 5/1970 | Batten | |
| 3,713,929 A * | 1/1973 | Bottasso et al. | 156/127 |
| 3,826,297 A | 7/1974 | Alderfer | |
| 3,887,423 A | 6/1975 | Gazuit | |
| 4,007,069 A * | 2/1977 | Takayanagi et al. | 156/123 |
| 4,283,241 A * | 8/1981 | Hollmann | 156/117 |
| 4,614,562 A | 9/1986 | Jones | |
| 5,268,057 A | 12/1993 | Nojiri et al. | |
| 5,445,695 A | 8/1995 | Ozawa et al. | |
| 5,755,922 A | 5/1998 | Baldoni et al. | |
| 6,000,454 A | 12/1999 | Barody et al. | |
| 6,328,084 B1 | 12/2001 | Caretta et al. | |
| 2002/0157751 A1 | 10/2002 | Armellin et al. | |
| 2003/0034132 A1 | 2/2003 | De Graaf et al. | |
| 2003/0102088 A1* | 6/2003 | Iiduka | 156/394.1 |
| 2004/0089400 A1 | 5/2004 | Vargo et al. | |
| 2005/0145314 A1 | 7/2005 | Ikeda et al. | |
| 2005/0161141 A1* | 7/2005 | Nakagawa | 152/546 |
| 2005/0224159 A1 | 10/2005 | Suda et al. | |
| 2006/0011285 A1* | 1/2006 | Suda | 156/117 |
| 2006/0108051 A1 | 5/2006 | Lacagnina | |
| 2007/0246164 A1 | 10/2007 | De Laubier et al. | |
| 2008/0202690 A1 | 8/2008 | Painter | |
| 2008/0216941 A1 | 9/2008 | Lacagnina et al. | |

FOREIGN PATENT DOCUMENTS

| | | |
|---|---|---|
| EP | 0 822 059 A1 | 2/1998 |
| EP | 1 211 057 A2 | 6/2002 |
| EP | 1 358 998 A1 | 11/2003 |
| EP | 1 418 043 A2 | 5/2004 |
| EP | 1 847 380 A1 | 4/2007 |
| FR | 1 485 919 A | 6/1967 |
| JP | 6-75932 | 9/1994 |
| JP | 10-86241 | 4/1998 |
| JP | 2006 248163 | 9/2006 |
| KR | 2005-72774 | 7/2005 |
| WO | WO 2004/037523 A1 | 5/2004 |
| WO | WO 2005/097478 A1 | 10/2005 |
| WO | WO 2005/108048 A1 | 11/2005 |
| WO | WO 2005/123371 A1 | 12/2005 |
| WO | WO 2008/099236 A1 | 8/2008 |
| WO | WO 2009/128103 A1 | 10/2009 |

OTHER PUBLICATIONS

English-language translation of Notification of the First Office Action issued Oct. 30, 2012 by State Intellectual Property Office of the People's Republic of China in corresponding Application No. CN 200880129458.X (8 pages).
International Search Report from the European Patent Office for International Application No. PCT/IT2008/000355, mailing date Feb. 17, 2009.
Notification of the First Office Action from the Korean Patent Office, in counterpart Korean Application No. 10-2010-7024758 (mailed Jun. 18, 2014).
International Preliminary Report on Patentability for International Application No. PCT/IT2008.000355 dated Nov. 30, 2010.

* cited by examiner

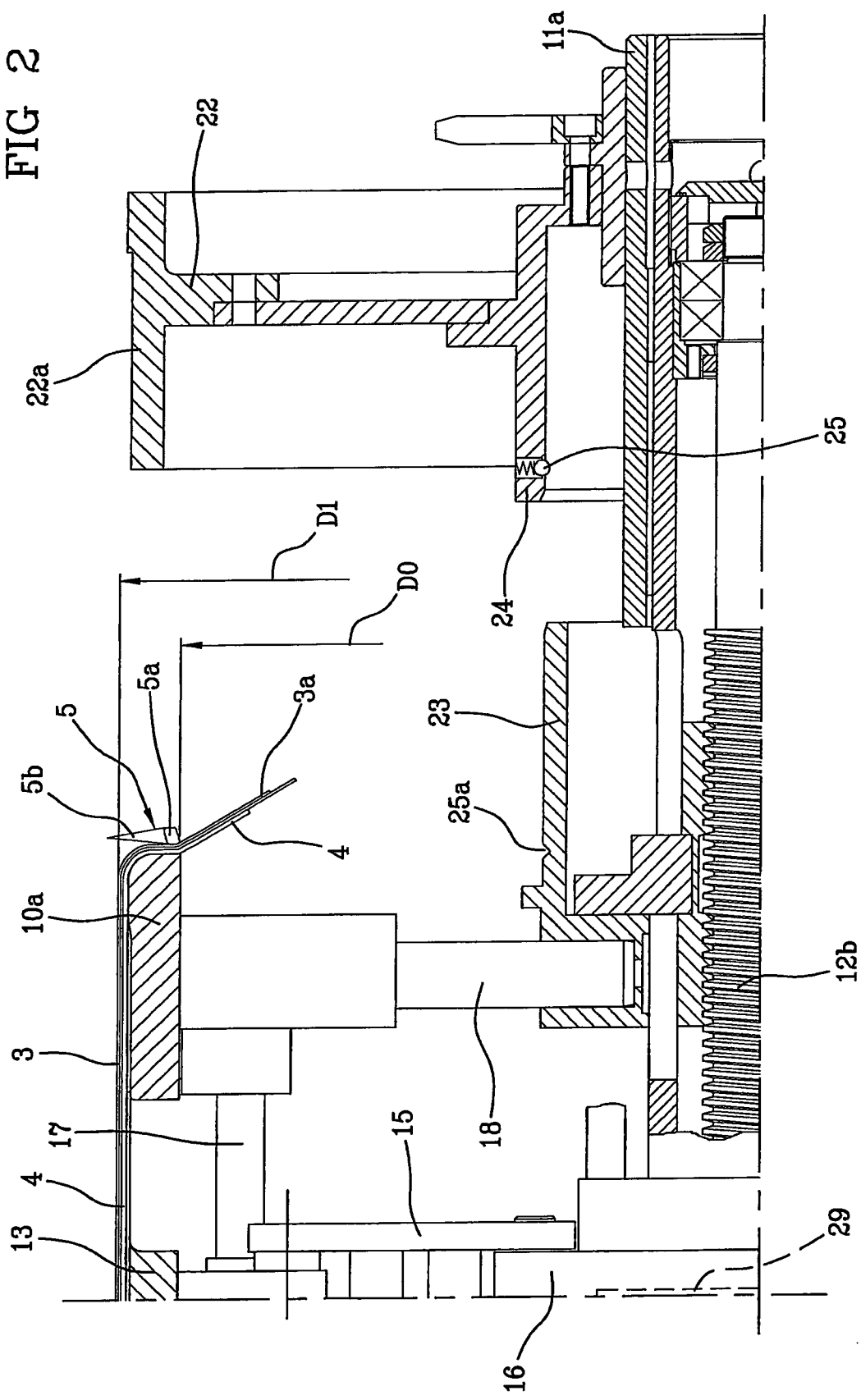

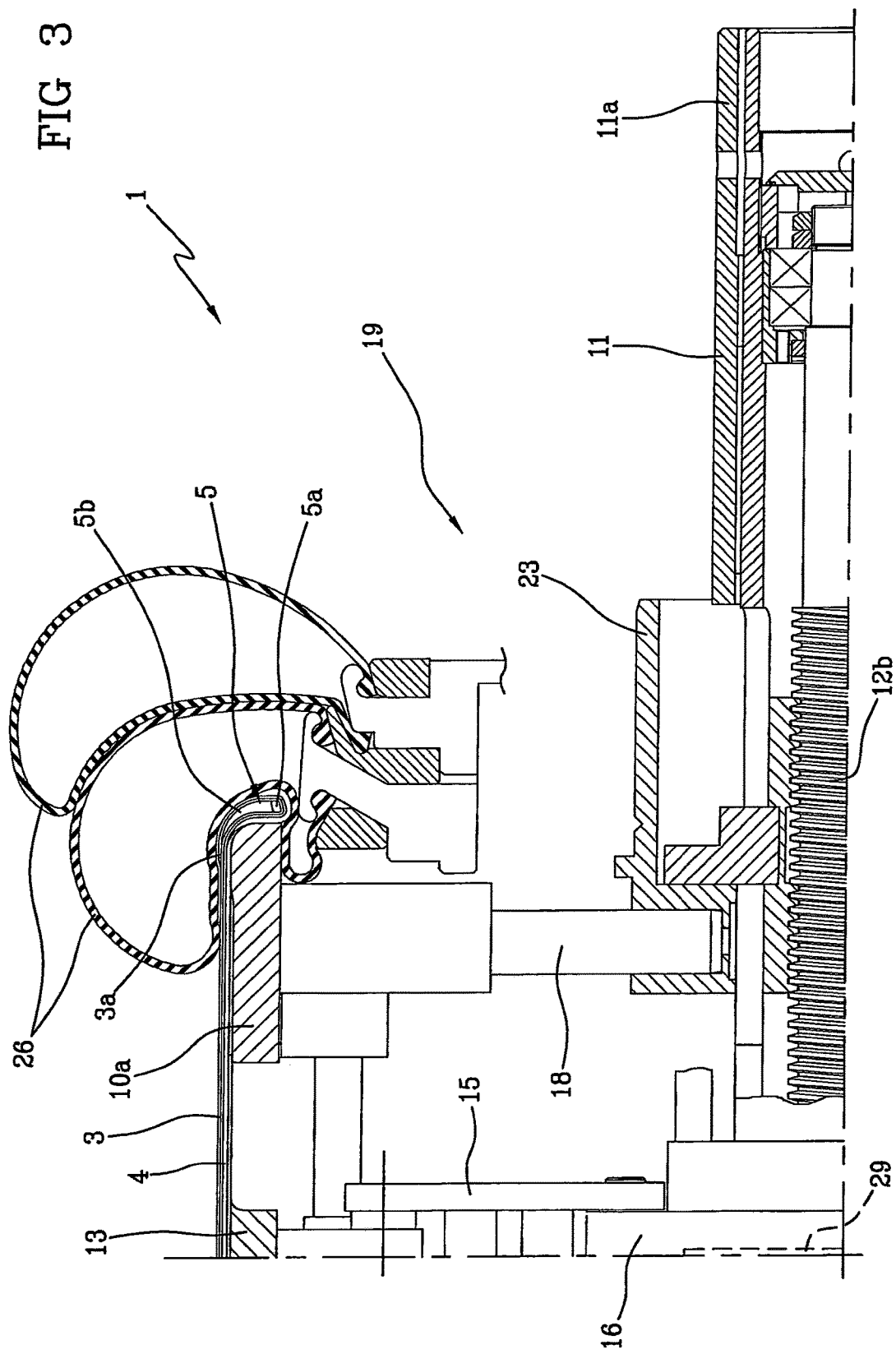

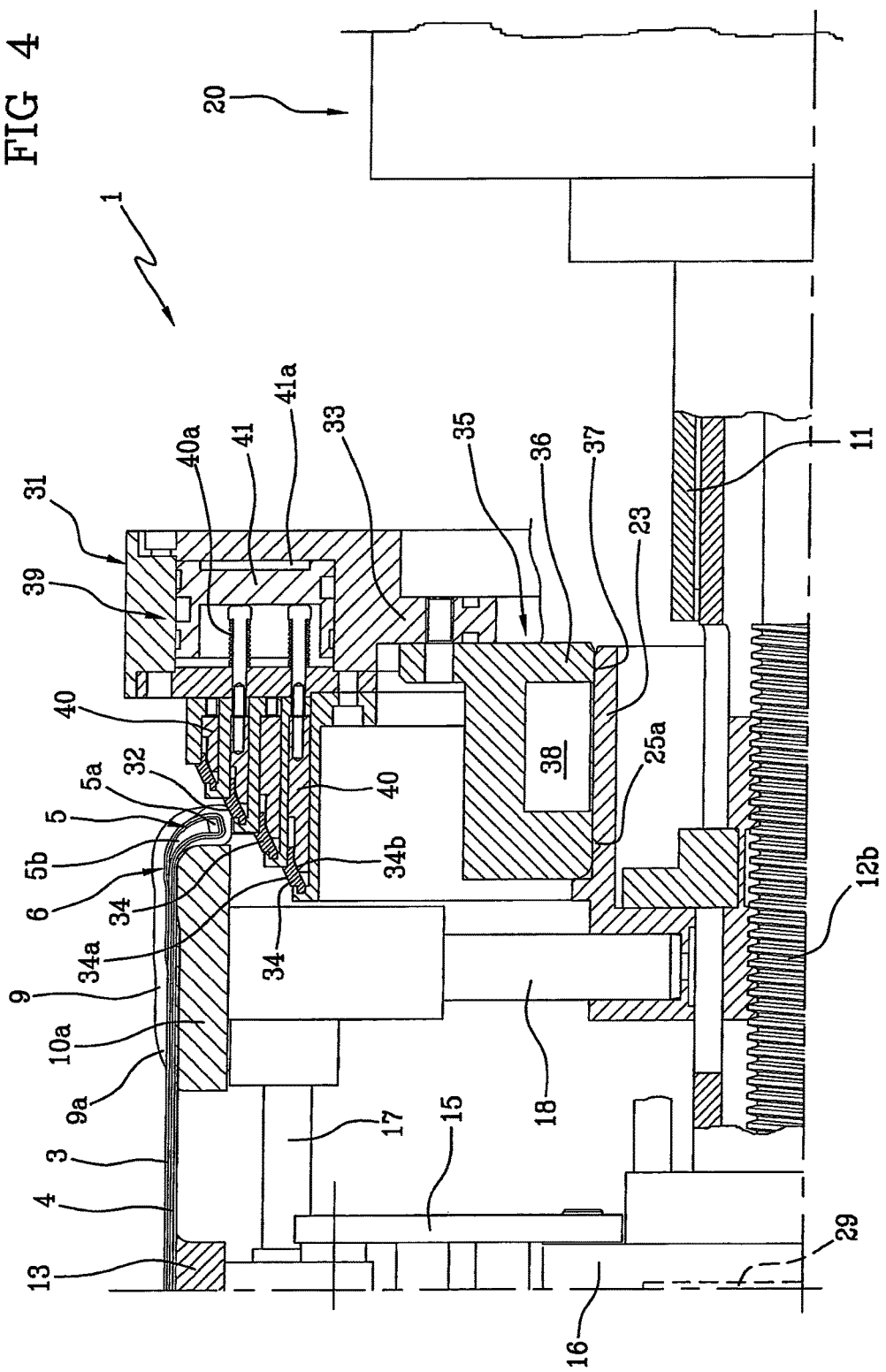

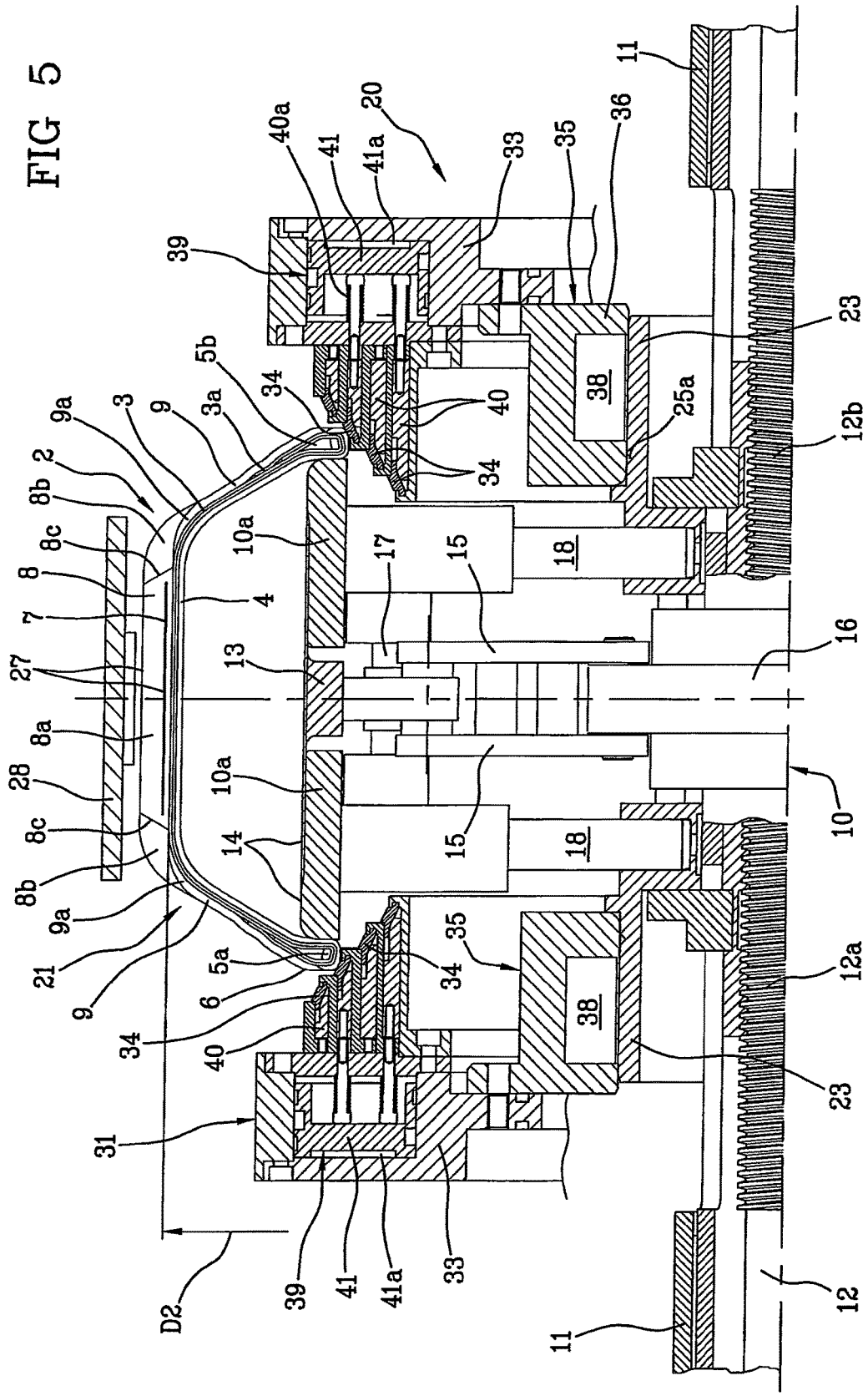

PROCESS AND APPARATUS FOR BUILDING TYRES

CROSS REFERENCE TO RELATED APPLICATION

This application is a national phase application based on PCT/IT2008/000355, filed May 28, 2008, the content of which is incorporated herein by reference.

BACKGROUND OF THE INVENTION

Field of the Invention

The present invention relates to a process and an apparatus for building tyres.

In more detail, the invention is directed to the process and equipment used for building a green tyre to be subsequently submitted to a vulcanisation cycle so as to obtain the final product.

Description of the Related Art

A tyre for vehicle wheels generally comprises a carcass structure including at least one carcass ply having respectively opposite end flaps in engagement with respective annular anchoring structures, integrated into the regions usually identified as "beads", having an inner diameter substantially corresponding to a so-called "fitting diameter" of the tyre on a respective rim.

Associated with the carcass structure is a belt structure comprising one or more belt layers, positioned in radially superposed relationship with respect to each other and to the carcass ply and having textile or metallic reinforcing cords with a crossed orientation and/or substantially parallel to the circumferential extension direction of the tyre. A tread band, also of elastomeric material like other semifinished products constituting the tyre, is applied to the belt structure, at a radially external position.

Respective sidewalls of elastomeric material are in addition applied, at an axially external position, to the side surfaces of the carcass structure, each extending from one of the side edges of the tread band until close to the respective annular anchoring structure to the beads.

In tyres of the "tubeless" type, an airtight coating layer, usually referred to as "liner" covers the inner surfaces of the tyre.

Subsequently to building of the green tyre carried out through assembling of respective components, a vulcanisation and moulding treatment is generally executed which aims at determining the structural stabilisation of the tyre through cross-linking of the elastomeric compounds and also at impressing said tyre with a desired tread pattern and possible distinctive graphic marks at the sidewalls.

The carcass structure and belt structure are generally made separately in respective work stations, to be mutually assembled at a second time.

In more detail, manufacture of the carcass structure first contemplates application of the carcass ply or plies onto a building drum so as to form a so-called "carcass sleeve" that is substantially cylindrical. The annular anchoring structures to the beads are fitted or formed on the opposite end flaps of the carcass ply or plies that are subsequently turned up around the annular structures themselves so as to enclose them loop-wise.

At the same time, a so-called "outer sleeve" is formed on a second or auxiliary drum, which outer sleeve comprises the belt layers applied in mutual radially superposed relationship, and possibly the tread band applied at a radially external position to the belt layers. The outer sleeve is then picked up from the auxiliary drum to be coupled to the carcass sleeve. To this aim, the outer sleeve is disposed in coaxial relationship around the carcass sleeve, and then the carcass sleeve or sleeves are shaped into a toroidal configuration by mutual axial approaching of the beads and simultaneous admission of fluid under pressure into the carcass sleeve, so as to determine radial expansion of the carcass plies until causing adhesion of same against the inner surface of the outer sleeve.

Concurrently with application of the carcass ply/plies against the radially internal surface of the outer sleeve, coupling of the radially external apices of the sidewalls to respective axially external end portions of the tread band is also determined. In more detail, the end portions of the tread band can be disposed in radially superposed relationship relative to the radially external apices of the sidewalls, to define a construction configuration of the so-called "underlying sidewall" type. Alternatively, the radially external apices of the sidewalls can be axially superposed on the axially external end portions of the tread band, according to a construction configuration of the so-called "overlying sidewall" type.

Assembling between the carcass sleeve and the outer sleeve can be carried out on the same drum as used for making the carcass sleeve, in which case the process is referred to as "unistage process" or "building process carried out in a single stage".

Also known are building processes of the so-called "two-stage" type in which a so-called "first-stage drum" is used for making the carcass sleeve, while assembly between the carcass sleeve and outer sleeve is carried out on a so-called "second-stage drum" or "shaping drum", onto which the carcass sleeve picked up from the first-stage drum and subsequently the outer sleeve picked up from the auxiliary drum are transferred.

U.S. Pat. No. 3,826,297 contemplates use of a dismountable first-stage drum to enable disengagement of the carcass sleeve, previously formed by positioning annular anchoring structures against side shoulders provided on the drum, and subsequently forming the carcass ply or plies through application of circumferentially consecutive strip-like elements, to cover the circumferential extension of the first-stage drum.

EP 1211057 proposes formation of sidewalls by winding up a continuous elongated element of raw elastomeric material into coils disposed in axially approached and/or radially superposed relationship on the carcass sleeve shaped into a toroidal conformation, so as to couple it to the outer sleeve positioned around it. Manufacture of the sidewalls can be carried out either before completing the carcass sleeve conformation, so as to obtain a construction scheme of the "underlying sidewall" type, or when conformation has been completed, so as to obtain a construction scheme of the "overlying sidewall" type.

EP 1358998 proposes manufacture of a carcass sleeve on a first-stage drum, which carcass sleeve comprises a pair of annular anchoring structures fitted around the axially opposite end flaps of a carcass ply disposed around the drum itself. The end flaps of the carcass ply are turned up around the annular anchoring structures; afterwards, manufacture of the sidewalls is carried out, through winding of at least one continuous elongated element of raw elastomeric material into coils disposed in axially approached and/or radially superposed relationship on the carcass sleeve.

SUMMARY OF THE INVENTION

The Applicant has noticed that the construction configuration of the "overlying sidewall" type offers more reliability as regards coupling in the sidewall/tread interface, but involves construction complications in the tyre manufacturing process. Vice versa, the "underlying sidewall" configuration is of easier manufacture, but reliability in coupling is somewhat critical between the apex of the sidewall and the tread band where, following use and ageing of the tyre, undesirable separations can occur.

In accordance with the present invention, the Applicant has verified that an excellent quality of the product can be achieved by carrying out the whole manufacture of the green tyre without removing the carcass structure from the building drum.

In more detail, the Applicant has dealt with the problem of avoiding transportation of a carcass sleeve and reducing deformations of the tyre being processed, particularly during the shaping step.

The Applicant has also noticed that the sidewalls manufactured as a semifinished product of one piece construction and laid on the not yet shaped carcass sleeve, must be submitted to important stretching actions during the shaping step, above all in the radially outermost regions where the sidewall, originally formed to the laying diameter, must reach a diameter substantially equal to that of the outer sleeve. The Applicant has further perceived that this stretching action can involve undesirable stresses on the carcass structure.

In the above described context, the Applicant has also dealt with the problem of obtaining an optimal junction without structural and/or surface discontinuities between the radially external flaps of the sidewalls and the axially external portions of the tread band.

The Applicant has perceived that the above mentioned problems could be solved by in addition providing a suitable building step for the sidewalls in which said sidewalls could be directly formed on a carcass sleeve of cylindrical shape through assembly of elementary components and more exactly by winding up at least one continuous elongated element of elastomeric material.

The Applicant has therefore found that:
  by building a carcass sleeve on an application diameter larger than the fitting diameter of the tyre; and
  by forming the sidewalls before carrying out the shaping step, through laying of at least one continuous elongated element into axially approached coils superposed on said carcass sleeve, the problems set out above can be solved in an efficient manner, with particular reference to the tread band/sidewall interface when, subsequently to the step of building the carcass sleeve, shaping of the latter is carried out for coupling it to an outer sleeve without the carcass sleeve being released from its building drum.

More specifically, in a first aspect, the present invention relates to a process for building tyres, comprising the steps of:
  providing a building drum having an outer circumferential surface defining an application diameter;
  providing two axially approachable halves in said building drum;
  applying at least one carcass ply having axially opposite end flaps around said outer circumferential surface, according to said application diameter;
  engaging an annular anchoring structure defining a fitting diameter that is smaller than said application diameter, coaxially around each of the end flaps, so as to make a carcass sleeve;
  forming at least one pair of sidewalls around the carcass sleeve by laying of at least one first continuous elongated element into approached coils.

It is the Applicant's opinion that the sidewalls thus obtained are adapted to be advantageously coupled, during shaping into an "underlying sidewall" construction configuration, to axially opposite end portions of the tread band, preferably obtainable by laying of at least one continuous elongated element of the same composition as the one used for manufacture of the sidewalls, so as to obtain a junction without structural and surface discontinuities, having functional features typical of an "overlaying sidewall" construction configuration.

Finally, the Applicant has verified that the amount of stretching imposed to the sidewalls during the shaping step is advantageously reduced due to laying of the carcass plies to a diameter larger than the fitting diameter. Therefore, the risks that the sidewalls be torn and/or that structural deformations may occur on the carcass structure are eliminated.

The deformations imposed to the sidewalls can be further advantageously exploited for the purpose of homogenising the structure of same by making thinner and bringing together the coils formed by the continuous elongated element used for formation of said sidewalls.

According to a further aspect, the present invention relates to an apparatus for building tyres, comprising:
  a building drum including two axially approachable halves and having an outer circumferential surface defining an application diameter;
  devices for applying at least one carcass ply having axially opposite end flaps around an outer circumferential surface of the building drum;
  devices for engaging an annular anchoring structure with a fitting diameter smaller than said application diameter, coaxially around each of the end flaps of said at least one carcass ply, so as to make a carcass sleeve;
  devices for forming at least one pair of sidewalls around the carcass sleeve, by laying of at least one first continuous elongated element in the form of approached coils.

The present invention, in at least one of the above aspects, can have one or more of the preferred features described hereinafter.

Before application of said at least one carcass ply, auxiliary support members each having at least one circumferential rest surface extending in the continuation of the circumferential outer surface of the building drum are engaged to the building drum, each in axially approached relationship with one of said halves.

The axially opposite end flaps of said at least one carcass ply applied around the outer circumferential surface of the building drum lie each on the circumferential rest surface of the respective auxiliary support member.

Said auxiliary support members are disengaged from the building drum, before engagement of said annular anchoring structures.

Preferably, before engagement of said annular anchoring structures, the end flaps of said at least one carcass ply are folded up towards a geometric axis of the building drum. In this way, insertion of the annular anchoring structures around the end flaps is facilitated.

Preferably, the step of engaging each annular anchoring structure comprises:
  fitting the annular anchoring structure coaxially around the respective end flap of said at least one carcass ply;
  turning up the end flap of said at least one carcass ply around the respective annular anchoring structure.

Preferably, also carried out is the step of shaping said at least one carcass ply into a toroidal configuration, concurrently with mutual approaching of the halves of the building drum.

The process according to the invention therefore enables green tyres to be obtained while maintaining the carcass structure of the tyre being processed fixed on its building drum, also using elementary components possibly different from each other, in a plurality of work stations. Thus the Applicant could ascertain that in this manner an excellent production flexibility is obtained without impairing the plants' productivity.

The shaping step is preferably carried out after formation of the sidewalls on the carcass sleeve.

Before the step of shaping the carcass sleeve, auxiliary shaping members can be operatively engaged to the building drum, each of them in axially approached relationship with one of said halves.

Preferably, each auxiliary shaping member acts against a circumferential abutment edge carried by the building drum.

Each auxiliary shaping member is preferably brought into thrust relationship against one of said annular anchoring structures.

In fact, the Applicant has found that through use of a building drum suitable for being associated, at the end of building of the carcass structure, with suitable shaping members to enable toroidal conformation of the tyre under processing, sequential building of tyres different from each other in terms of sizes, structure and materials can be simplified, among other things also improving both the production and quality aspects of the products thus obtained.

Each auxiliary support member is engaged to the building drum at least at a connecting member carried by the building drum itself.

Preferably, each auxiliary shaping member is engaged to said at least one connecting member, in place of each auxiliary support member.

The Applicant has perceived that in said preferred embodiment solving the above described problems, a building drum must necessarily be available which includes suitable connecting members adapted to be operatively associable both with auxiliary support members necessary for the different building steps of the different components, and with said auxiliary shaping members necessary at the end of building in order to enable the drum to give the tyre under processing the desired conformation.

Concurrently with engagement of said auxiliary shaping members to the building drum, a step of locking said at least one carcass ply relative to said at least one annular anchoring structure is carried out.

Preferably, engagement of each auxiliary shaping member to the building drum comprises the steps of fastening a flanged element of the auxiliary shaping member relative to the building drum and pushing a sealing ring of the auxiliary shaping member against said circumferential abutment edge.

Fastening of the flanged element ensures an efficient contrast of the thrusts generated during the shaping step, by effect of the fluid under pressure admitted into the carcass structure. The thrust of the sealing ring in turn ensures locking of the carcass ply/plies relative to the annular anchoring structures, also in the presence of plastic yielding of the elastomeric material.

Preferably, before conformation of the carcass ply, there is a step in which an outer sleeve comprising at least one belt structure is positioned at a coaxially centred location around said at least one carcass ply, for applying said at least one carcass ply against a radially internal surface of the outer sleeve, following the shaping step.

Advantageously, said outer sleeve can be formed by laying of elementary components on an auxiliary drum.

Preferably, said outer sleeve further comprises a tread band made by laying of at least one second continuous elongated element into coils disposed in approached relationship, at a radially external position around said belt structure.

Preferably, said tread band has axially opposite end portions each overlapping a radially external apex of one of said sidewalls.

More particularly, each of said end portions is preferably made by laying of at least one third continuous elongated element.

Preferably, said third continuous elongated element has the same composition as that of said at least one first continuous elongated element used for manufacturing the respective sidewalls.

Preferably, said third continuous elongated element is at least partly laid on an outer surface of the auxiliary drum having a substantially cylindrical outline.

Preferably, said axially opposite end portions are coupled to a central portion of the tread band according to coupling outlines mutually converging away from a geometric axis of the tyre. This gives rise to an undercut promoting reliability of said mutual coupling.

In this manner, an excellent chemical and geometric compatibility is ensured in the coupling interface between tread band and sidewalls.

Preferably, at least the carcass ply/plies is made by laying of elementary components on the building drum.

In more detail, application of said at least one carcass ply comprises a step of applying a plurality of strip-like elements disposed in succession along the circumferential extension of the outer surface of the building drum.

Preferably, said application diameter is included between about 102% and about 120% of the fitting diameter.

Advantageously, the application diameter can be included between about 30% and about 90% of an inner diameter of said outer sleeve.

Preferably, the difference between the application diameter and fitting diameter is in the range of about 2% to about 70% of the difference between an inner diameter of said outer sleeve and the fitting diameter.

Preferably, at least one pair of auxiliary support members is provided, which can be removably engaged to the building drum, each in axially approached relationship with a respective half of the building drum.

The auxiliary support members preferably have respective circumferential rest surfaces extending in the continuation of said outer circumferential surface to support at least the axially opposite end flaps of said at least one carcass ply.

Also preferably provided are devices for disengaging said auxiliary support members from the building drum.

Said shaping devices preferably comprise at least one pair of auxiliary shaping members to be removably engaged to the building drum, each in axially approached relationship with one of said halves. In this manner toroidal conformation of said at least one carcass ply is allowed, concurrently with mutual approaching of said halves of the building drum.

Connecting members can be carried by the building drum for engaging said auxiliary support members and, selectively, said auxiliary shaping members.

More particularly, each auxiliary shaping member can be removably engaged to the building drum in place of one of said auxiliary support members.

Therefore said connecting members standardise the mechanical association of the building drum with external devices distinct therefrom which are required for manufacture of the built green tyre, according to the above depicted productivity and flexibility features, in addition also reducing the manufacture complexity of the building drum.

The building drum further comprises a central section slidably engaging said halves and defining a central section of said outer circumferential surface.

In this way more versatility of use of the drum is achieved, which lends itself to be adapted to working of tyres having different sizes in terms of distance between centres of the annular anchoring structures.

Preferably, said at least one auxiliary shaping member comprises at least one flanged element to be removably fastened in axially approached relationship to the respective half of the building drum and carrying at least one sealing ring designed to act against a respective circumferential abutment edge carried by the building drum.

Preferably, said at least one auxiliary shaping member further comprises thrust devices operating between the flanged element and sealing ring to push the latter towards the circumferential abutment edge.

Preferably, said at least one auxiliary shaping member comprises a plurality of sealing rings which are respectively concentric and have respectively different diameters.

Preferably, provision is made for devices designed to locate an outer sleeve comprising a belt structure at a coaxially centred position around the carcass sleeve formed on the building drum.

More preferably, also provided is at least one auxiliary drum as well as devices for forming said outer sleeve by laying of elementary components on the auxiliary drum.

Preferably, also provided are devices for forming a tread band by laying of at least one second continuous elongated element into coils disposed in approached relationship at a radially external position around the belt structure.

More preferably, the devices for forming the tread band comprise members for forming axially opposite end portions of the tread band by laying of at least one third continuous elongated element.

Advantageously, said third continuous elongated element has the same composition as that of said at least one first continuous elongated element used for manufacture of the respective sidewalls.

According to a preferred embodiment, the devices for making said at least one carcass ply carry out laying of elementary components on the building drum.

Preferably, the devices for making said at least one carcass ply carry out laying of a plurality of strip-like elements disposed in succession along the circumferential extension of the outer circumferential surface of the building drum.

Further features and advantages will become more apparent from the detailed description of a preferred but not exclusive embodiment of a process and an apparatus for building tyres in accordance with the present invention.

BRIEF DESCRIPTION OF THE DRAWINGS

This description will be set out hereinafter with reference to the accompanying drawings, given by way of non-limiting example, in which:

FIG. 2 shows a step in which annular anchoring structures are coaxially fitted on the respective end flaps of the carcass ply/plies, to an enlarged scale relative to FIG. 1;

FIG. 3 shows a step of turning up the end flaps of the carcass ply/plies around the respective annular anchoring structures, to an enlarged scale relative to FIG. 1;

FIG. 4 diagrammatically shows a carcass sleeve in diametrical section, in an engagement step of the beads by auxiliary shaping members;

FIG. 5 shows a tyre under processing during the step in which the carcass sleeve is being shaped for application of an outer sleeve thereto.

DETAILED DESCRIPTION OF THE INVENTION

Figures 1, 1A:
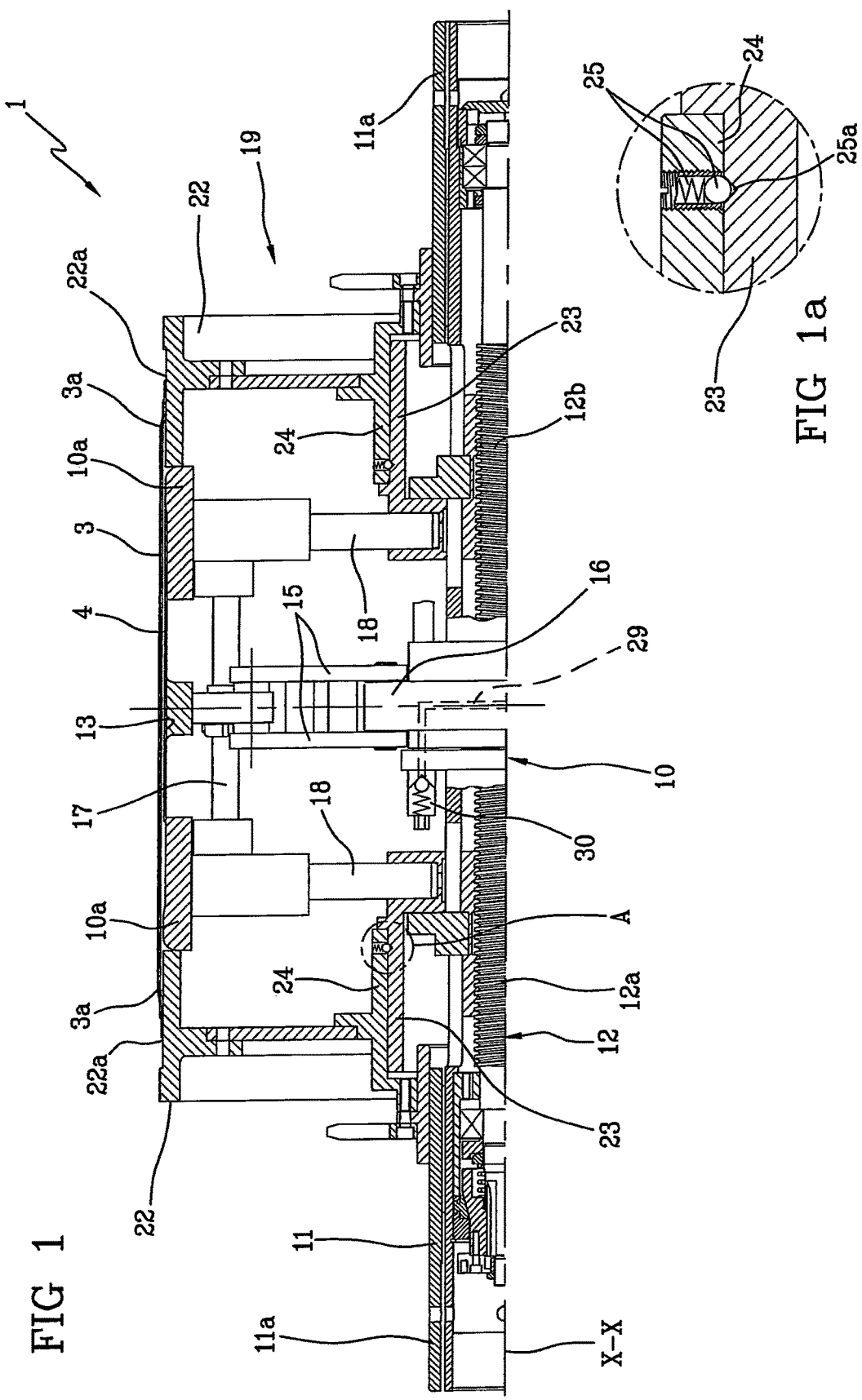
FIG. 1 diagrammatically shows in diametrical section, an application step of a carcass ply around a building drum.
FIG. 1a shows the detail marked "A" in FIG. 1, to an enlarged scale.

With reference to the drawings, an apparatus for building tyres for vehicle wheels, designed to put into practice a process according to the present invention has been generally identified by reference numeral 1.

Apparatus 1 is intended for manufacturing tyres 2 (FIG. 5) essentially comprising at least one carcass ply 3 preferably internally coated with a layer of airtight elastomeric material or a so-called liner 4. Two annular anchoring structures 5 each comprising a so-called bead core 5a preferably carrying an elastomeric filler 5b at a radially external position, are in engagement with respective end flaps 3a of the carcass ply/plies 3. The annular anchoring structures 5 are integrated in the vicinity of regions normally identified as "beads" 6, at which usually engagement between tyre 2 and a respective mounting rim (not shown) occurs, according to a fitting diameter D0 determined by the inner diametrical sizes of the annular anchoring structures 5.

A belt structure 7 is circumferentially applied around the carcass ply/plies 3, and a tread band 8 circumferentially overlaps the belt structure 7. Two sidewalls 9, each extending from the corresponding bead 6 to a corresponding side edge of the tread band 8, are applied to the carcass ply/plies 3 at laterally opposite positions.

Apparatus 1 comprises a building drum 10 having two halves 10a supported by a central shaft 11 extending along a geometric axis X-X of the building drum 10 itself. Halves 10a can be axially moved close to each other, upon command of a threaded bar 12 for example, which is operatively disposed within the central shaft 11 and carries two threaded portions 12a, 12b, a right-handed portion and a left-handed portion respectively, each engaging one of halves 10a. Halves 10a of the building drum 10 are consequently induced to simultaneously translate in respectively opposite directions along the central shaft 11, following rotations imparted to the threaded bar 12 through an actuator (not shown) that can be operatively coupled to an end of the central shaft 11.

The building drum 10 can further comprise a central section 13 slidably engaging halves 10a and extending in surface-continuity relationship relative to the latter so as to define therewith, at a radially external position, a substantially continuous outer surface 14.

Each of halves 10a and the central section 13 are made up of respective circumferential sectors radially movable between a rest condition (not shown) at which they are disposed radially close to the geometric axis X-X to give the building drum 10 a smaller diametrical bulkiness than the fitting diameter D0 of the tyre being processed, in order to enable removal of tyre 2 being processed from the building drum, and a work condition at which, as shown in the attached figures, they extend in circumferential-continuity relationship so as to form said outer surface 14 defining an application diameter D1 preferably larger than the fitting diameter.

In the embodiment shown, radial movement of the circumferential sectors is carried out through a plurality of connecting rods 15 each linked between one of the sectors of the central section 13 of the building drum 10 and a driving collar 16 rotatably carried by the central shaft 11 and drivable in angular rotation through an outer actuator (not shown). By transmission bars 17 axially extending through the sectors of the central section 13, the radial movements of said sectors are transmitted to the circumferential sectors of the axially opposite halves 10a of the building drum 10, slidably guided along respective columns 18 extending in a radial direction relative to the central shaft 11.

The building drum 10 lends itself to be transferred, by at least one robotized arm (not shown) or transfer devices of other type operating on at least one grip end 11a of the central shaft 11, to one or more work stations 19, 20 to enable different working steps to be carried out which aim at assembling the tyre 2 being processed.

For instance, the building drum 10 can first be engaged in a building station 19 (FIGS. 1 to 3) in which a so-called carcass sleeve 21 is made which comprises the carcass ply/plies coupled to the respective annular anchoring structures 5.

At least an external handling device (not shown as it can be made in known manner) positions auxiliary support members 22, made in the form of two annular elements for example, in axially approached relationship on axially opposite sides of the building drum 10.

The auxiliary support members 22 have respective rest surfaces 22a preferably having a substantially cylindrical conformation with a diameter substantially equal to the application diameter D1. When approaching has occurred, the rest surfaces 22a extend in continuity relationship in the extension of the outer surface 14.

Engagement of the support elements 22 to the building drum 10 takes place at respective connecting members 23 carried by the building drum itself, each of them being made for example in the form of a cylindrical sleeve, integrally carried by one of halves 10a of the building drum 10 and adapted to be operatively coupled to a first engagement seat 24 carried by the respective auxiliary support member 22.

One or more fitting elements 25 made in the form of small balls spring-pushed towards the geometric axis X-X for example, radially project inwardly of the first engagement seat 24 for operative coupling, in spring-thrust relationship, with at least one recess 25a obtained, in the form of a circumferential groove for example, in the respective connecting member 23. Consequently, the fitting elements 25 are suitable for automatic engagement in the recesses 25a of the respective connecting members 23, so as to retain each auxiliary support member 22 in engaged relationship with the building drum 10 also after release of said members by said external handling device. Thus the building drum 10 lends itself to be transferred, if necessary, between at least one first and one second work unit (not shown) provided in the building station 19, together with the auxiliary support members 22 linked thereto.

In the building station 10 auxiliary devices (non shown) can for example operate for applying first components of the carcass sleeve 21, in the region of the building drum. In more detail, these auxiliary devices can comprise one or more delivery devices feeding at least one continuous elongated element of elastomeric material while the building drum 10 is being driven in rotation around its geometric axis X-X, so as to form said liner 4 on the outer surface 14 and the rest surfaces 22a. In addition or as an alternative to liner 4, the auxiliary devices can be designed to form abrasion-proof inserts on the rest surfaces 22a, to be incorporated at of beads 6 and/or, in the case of the so-called run-flat tyres, auxiliary support inserts of elastomeric material (the so-called sidewall inserts) applied to the respective halves 10a of the building drum 10, so as to be then incorporated into tyre 2 in the region of sidewalls 9.

Subsequently to formation of said first components, devices not shown as they can be made in any convenient manner, apply the carcass ply/plies 3 around the outer surface 14, according to said application diameter D1. Each carcass ply 3 can consist of an article of manufacture in the form of a continuous tape previously cut to the circumferential extension of the outer surface 16 and delivered towards the latter, while the building drum 10 is rotating around its geometric axis X-X, so as to determine winding of said strip around the outer surface 14.

In a preferred embodiment, at least the carcass ply/plies 3 and/or other parts of tyre 2 are made by laying of elementary components. In the present specification and in the following claims, by the term "elementary components" it is intended to denote continuous thread elements of elastomeric material, rubberised textile and/or metallic cords, strip-like elements. It is to be pointed out that, to the aims of the present description, by "strip-like element" it is intended a tape of elastomeric material cut to size and comprising one or more textile or metallic reinforcing cords.

These elementary components are adapted to be used in suitable amounts so as to compose one or more of the above described constituent elements of the tyre, without storage of semi-finished products being required.

To this aim, the application devices comprise members for sequentially applying a plurality of strip-like elements disposed transversely of the circumferential extension of the outer surface 14, while the building drum 10 is being driven in rotation following a step-by-step course, in the same manner as described in document U.S. Pat. No. 6,328,084 in the name of the same Applicant, for example.

The carcass ply/plies 3 are then preferably directly formed on the building drum 10, by means of the strip-like elements applied in mutually approached relationship so as to cover the whole circumferential extension of the outer surface 14.

Preferably, the outer surface 14 has a smaller axial size than the width of said at least one carcass ply 3, so that the end flaps 3a of the carcass ply/plies 3 disposed on the building drum 10 axially project from the opposite ends of the outer surface 14 and are at least partly supported by said rest surfaces 22a.

When formation of the carcass ply/plies 3 has been completed, the auxiliary support members 22 are released from the respective connecting members 23. Release can be obtained with the aid of said external handling device for example, by a simple action involving axial moving apart from the respective halves 10a of the building drum 10, so as to remove the rest surfaces 22a from the abrasion-proof inserts, and/or from liner 4, and/or from the carcass ply/plies 3. When release has occurred, the auxiliary support members 22 can remain in engagement with the external handling device, ready for new use in a new working cycle.

Removal of the rest surfaces 22a makes it possible, after possible transfer of the building drum 10 to a further work unit, to fold up the end flaps 3a of the carcass ply/plies 3 applied around the building drum 10, towards the geometric axis X-X of the building drum 10 itself, for example with the aid of rollers or other devices not shown as they can be made in any convenient manner.

Locator members, not shown as they can be made in known manner, carry out fitting of each of the annular anchoring structures 5 coaxially around one of the end flaps 3a of the carcass ply/plies 3 folded towards the geometric axis X-X. The inner diameter of the annular anchoring structures 5, defining said fitting diameter D0, is smaller than the diameter of the outer circumferential surface 14, defining the application diameter D1 of the carcass ply/plies 3. Consequently, the annular anchoring structures 5 fitted on the end flaps 3a are suitable for location in axial abutment relationship, each against the corresponding half of the building drum 10.

When location has been completed, inflatable bags 26 or other turning-up members (FIG. 3) turn up each of the end flaps 3a around the respective annular anchoring structure 5, so as to stabilise engagement of same with the carcass ply/plies 3 determining formation of said carcass sleeve 21.

When engagement of the annular anchoring structures 5 has been completed or concurrently with this operating step, application of the sidewalls 9 can be carried out.

To this aim, the building drum 10 can be provided to be positioned, by means of said robotized arm for example, in front of at least one extruder (not shown as it can be made in known manner), or other devices adapted to deliver at least one first continuous elongated element of raw elastomeric material. Upon the action of the robotized arm the building drum 10 is submitted to a controlled movement, simultaneously with driving in rotation of same around its geometric axis X-X, so that the first continuous elongated element delivered by the extruder is applied to the carcass sleeve 21 in the form of axially approached coils starting from the respective annular anchoring structure 5 for example, so as to form each sidewall 9 around the carcass sleeve 21 disposed on the building drum 10 into a cylindrical conformation, as shown in FIG. 4. In this specification and in the following claims, "approached" coils means a formation of coils that can appear as: disposed in axial side by side relationship, in contact or not with each other, partly overlapping each other in the radial direction, overlapping each other in the radial direction, or in any other combination of said configurations.

The building drum 10 carrying the carcass sleeve 21 is then preferably transferred to a position 20 (FIGS. 4 and 5) external to the building station 19, for receiving an outer sleeve 27 in engagement, which sleeve integrates the belt structure 7 preferably already coupled to the tread band 8.

The outer sleeve 27 having an inner diameter D2 larger than the winding diameter D1, can be previously prepared by formation or winding of one or more belt layers adapted to form the belt structure 7 on an auxiliary drum (not shown), followed by winding of the tread band 8 on the belt structure 7 carried by the auxiliary drum. In more detail, building of the tread band 8 can be carried out by at least one extruder or other devices carrying out delivery of at least one second continuous elongated element of raw elastomeric material that is applied in the form of approached coils in a radially external position around the belt structure 7 carried by the auxiliary drum, while the latter is being driven in rotation and suitably moved in front of the delivery device, so as to form at least one central portion 8a of the tread band 8.

Another extruder or delivery members of other type can in addition be provided for delivery of at least one third continuous elongated element of raw elastomeric material preferably having the same composition as that of the first continuous elongated element used for manufacture of the respective sidewalls 9. The third continuous elongated element is adapted to be advantageously applied in the form of axially approached coils close to the axially opposite edges of the belt structure 7 and/or beyond said edges, i.e. onto the substantially cylindrical outer surface of said auxiliary drum so as to make axially opposite end portions 8b of the tread band 9, each extending in the continuation of the central portion 8a. Preferably, as shown in FIG. 5, laying of the second and of said at least one third continuous elongated element is executed in such a manner as to give the central portion 8a and the side portions 8b of the tread band 8 such a geometric conformation that the end portions 8b themselves are joined to the central portion 8a following coupling outlines 8c mutually converging away from the geometric axis X-X.

The outer sleeve 27 thus formed is adapted to be removed from the auxiliary drum, by a transfer ring 28 for example or other suitable devices that will then set it at a coaxially centred position around the carcass sleeve 21 carried by the building drum 10.

Shaping devices then act on the building drum 10 to shape the carcass sleeve 21 into a toroidal configuration (FIG. 5) so as to determine application of same against a radially internal surface of the outer sleeve 27.

Concurrently with the shaping step, the sidewalls 9, initially formed on the carcass sleeve 10 disposed in a substantially cylindrical conformation, are oriented radially away from the respective annular anchoring structures 5, until bringing each radially external apex 9a thereof in thrust relationship against one of the axially external end portions 8b of the tread band 8.

When shaping is over, the end portions 8b of the tread band 8 therefore are each superposed on the radially external apex 9a of the respective sidewall 9. Use of the same elastomeric blend for making sidewalls 9 and end portions 8b of the tread band 8 ensures chemical compatibility between these two components and excellent homogeneity and continuity in the sidewall/tread band junction. A rolling action can be carried out in known manner, to promote intimate union between the two components of the carcass sleeve 21 and the outer sleeve 27, at the end of the shaping step.

The shaping devices can for example comprise said actuator (not shown) provided for driving the threaded bar 12 in rotation so as to cause axial mutual approaching of halves 10a of the drum and, consequently, of the annular anchoring structures 5 of the carcass sleeve 21. Preferably, the shaping devices also comprise inflating members having a pneumatic circuit opening into at least one feeding duct 29 formed along the central shaft 11 for example, for supplying the carcass sleeve 21 with a working fluid and cause radial expansion of said sleeve through inflation, during mutual approaching of the annular anchoring structures 5.

Then at least one auxiliary shaping member 31 is operatively linked to the shaping drum 10, which member is adapted to complement the shaping devices to enable accomplishment of the shaping step of the carcass sleeve 21. More particularly, in a preferred embodiment, at least one pair of auxiliary shaping members 31 is operatively linked to the building drum 10, each being in axially approached relationship with one of said halves 10a. The auxiliary shaping members 31, which are components of apparatus 1 distinct from the building drum 10, lend themselves to act each against a circumferential abutment edge 32 carried by the building drum 10 itself, to enable toroidal conformation of the carcass ply/plies 3 concurrently with mutual approaching of halves 10*a*.

In more detail, each auxiliary shaping member 31 is adapted to act in thrust relationship against one of the annular anchoring structures 5, each defining one of said circumferential abutment edges 32, to keep beads 6 against the building drum 10 and/or lock the carcass ply/plies 3 relative to the annular anchoring structures 5 during the shaping step, so as to avoid undesirable creeping of the carcass ply/plies or any other undesirable deformation at the region of beads 6 during radial expansion of the carcass sleeve 21.

Each auxiliary shaping member 31 preferably comprises at least one flanged element 33 to be removably fastened in axially approached relationship to the respective half 10*a* of the building drum 10, and carrying at least one sealing ring 34 designed to act against the respective annular anchoring structure 5 carried by the building drum 10.

In more detail, a plurality of respectively concentric sealing rings 34 having respectively different diameters can be advantageously associated with each auxiliary shaping member 31. Thus the same auxiliary shaping members 31 can be advantageously utilised for processing a wide range of tyres having different fitting diameters.

The auxiliary shaping members 31 can be removably coupled to the respective connecting members 23 of the building drum 10, each in place of the respective auxiliary support member 22, by a fastening device 35 operatively carried by the flanged element 33. This fastening device 35 preferably comprises a guide sleeve 36 internally defining a second engagement seat 37 to be slidably engaged on the respective connecting member 23. Operatively mounted at the engagement seat 37 is a brake 38 preferably of the hydraulic or pneumatic type, not described in detail as it can be made in any convenient manner. After the auxiliary shaping members 31 have been each fitted on the respective connecting member 23 and axially translated until bringing one of the respective sealing rings 34 against the annular anchoring structure 5 of the carcass sleeve, brakes 38 are driven so as to cause steady axial anchoring of the auxiliary shaping members relative to the building drum 10.

Preferably, each sealing ring 34 acts against the respective annular anchoring structure 5 by a radially external frustoconical surface 34*a* of the sealing ring 34 itself. The sealing ring 34 can thus exert a thrust action against the carcass ply/plies 3 turned up around the annular anchoring structure 5, which thrust action is concentrated along a radially internal circumferential edge of the annular anchoring structure 5 (coincident with said abutment edge 32). This thrust action thus appears to be particularly adapted to avoid undesirable creeping actions of the cords forming the carcass ply/plies 3 by effect of stresses transmitted during the shaping step.

At the same time the sealing rings 34, preferably having a continuous circumferential extension, perform the function of hermetically sealing the carcass sleeve 21 at the annular anchoring structures 5, facilitating radial expansion of the sleeve itself and maintenance of the inflated state following the shaping step.

The Applicant has further noticed that the thrust action exerted by the sealing rings 34 could however decrease during the shaping step, due to the typical yielding character of the raw elastomeric material.

Therefore it is preferably provided that each auxiliary shaping member 31 should further comprise thrust devices 39 operating between the respective flanged element 33 and the sealing rings 34, to enable the sealing ring 34 acting against the respective annular anchoring structure 5 to be maintained in thrust relationship against the latter during the whole shaping step of the carcass sleeve 21. In this way, arising of creeping phenomena concerning the cords of the carcass ply/plies 3 turned up around the annular anchoring structures 5 is avoided, also in the presence of plastic yielding of the elastomeric material disposed close to beads 6.

According to a preferred embodiment, the thrust devices 39 comprise at least one thrust ring 40 slidably in engagement with the flanged element 33 and axially movable towards the sealing ring 34 upon the action of a fluid-operated actuator 41.

More particularly, a plurality of thrust rings 40 is preferably provided, each of said rings being associated with one of the sealing rings 34. Each sealing ring 34 is radially expandable by effect of axial movement of the respective thrust ring 40. To facilitate this expansion, each sealing ring 34 can have a radially internal frustoconical surface 34*b* facing a circumferential edge of the thrust ring 40, so that radial expansion is facilitated.

Advantageously, a single fluid-operated actuator 41, for example comprising an annular piston pushed by air or other fluid under pressure admitted into a bladder 41*a* formed in the flanged element 33, can simultaneously operate on all thrust rings 40 associated with the respective auxiliary shaping member 31, overcoming the action of respective return springs 40*a*. The thrust action will however act on the only sealing ring 34 operating in abutment against the annular anchoring structure 5.

In conclusion, during the whole shaping step, the action of brakes 38 on the respective connecting members 23 ensures steady positioning of the auxiliary shaping members 31, and efficiently counteracts the important stresses tending to axially move them away from the building drum 10, by effect of the inflating pressure created within the carcass sleeve 21. At the same time, the thrust devices 39 ensure that, in spite of the axial locking action carried out by brakes 38, the sealing rings 34 are constantly maintained in thrust relationship against the annular anchoring structures 5, also in the presence of plastic yielding of the elastomeric material.

As previously mentioned, application of the carcass ply/plies 3 on the building drum 10 according to an application diameter D1 larger than the fitting diameter D0 defined by the annular anchoring structures 5, advantageously allows restriction of the deformations suffered by the carcass ply/plies for reaching a position against the inner surface of the outer sleeve 27 through radial expansion during the shaping step.

Such reduced deformations result in less stresses transmitted to the bead regions 6, thus advantageously increasing geometric and structural accuracy of same, as well as in less thinning of the cords of the carcass ply/plies 3, particularly at the crown regions in contact with the belt structure 7. Since thinning of the cords in the carcass ply 3 following radial expansion can give rise to a reduced uniformity along the circumferential extension of tyre 2, a greater thickness or density also advantageously brings about more homogeneity in the circumferential distribution of the carcass cords in the crown regions.

In enjoying the advantages of the present invention at best, a person skilled in the art will be able to experience, within the preferred values, those set out relative to the application diameter D1, taking care that they must be intended as average values measured between the radially innermost surface and the radially outermost surface of the assembly of the carcass plies.

The Applicant has found preferable that the application diameter D1 of the carcass ply/plies 3 be included between about 102% and about 120% of the fitting diameter D0.

More preferably, said application diameter D1 can be included between about 105% and about 115% of the fitting diameter D0.

In a preferred embodiment of the process of the invention, the application diameter D1 is included between about 30% and about 90% of the inner diameter D2 of the outer sleeve 27 (which is coincident with the inner diameter of the belt structure).

More preferably, said application diameter D1 is included between about 50% and about 80% of the inner diameter D2 of the outer sleeve 27.

It is also preferable for the difference between the application diameter D1 and fitting diameter D0 to be included between about 2% and about 70% of the difference between the inner diameter D2 of the outer sleeve 27 and the fitting diameter D0.

More preferably, the difference between the application diameter D1 and fitting diameter D0 can be included between about 20% and about 50% of the difference between the inner diameter D2 of the outer sleeve 27 and the fitting diameter D0.

To the aims of the present invention, the process and apparatus in accordance with the invention are to be preferably used for producing high and ultra high performance low-section tyres.

In the present specification, by low-section tyre it is intended a tyre having a reduced section ratio, i.e. in which the section height measured between the radially outermost point of the tread band and the radially innermost point of the bead, is lower than about 50% of the section width axially measured at the maximum-chord point of the tyre. More specifically, "low-section tyres" will be considered those in which the section height is included between about 20% and about 50% of the section width.

In fact, since in these low-section tyres the difference between the final diameter of the carcass sleeve 21 at the end of the shaping step (corresponding to the diameter of the outer sleeve 27) and the fitting diameter D0 is relatively reduced, the decrease in the difference between the final-shaping diameter (corresponding to D2) and the application diameter of the carcass ply/plies 3 (corresponding to D1) allows a more important uniformity effect to be achieved in the carcass structure.

When building has been completed, tyre 2 can be removed from the building drum 10 after disengagement of the auxiliary shaping members 31 and radial contraction of the drum itself, to be submitted to a vulcanisation step to be carried out in any convenient manner.

The invention claimed is:

1. A process for building a tyre, the process comprising:
providing a building drum having an outer circumferential surface defining an application diameter;
providing two axially approachable halves in said building drum;
applying at least one carcass ply having axially opposite end flaps around said outer circumferential surface, according to said application diameter;
engaging an annular anchoring structure defining a fitting diameter that is smaller than said application diameter, coaxially around each of the end flaps, so as to make a carcass sleeve;
forming at least one pair of sidewalls around the carcass sleeve by laying of at least one first continuous elongated element into approached coils;
locating an outer sleeve at a coaxially centered position around said at least one carcass ply,
shaping said at least one carcass ply into a toroidal configuration, whereby said at least one carcass ply is applied against a radially internal surface of the outer sleeve;
wherein, before application of said at least one carcass ply, auxiliary support members, each having at least one circumferential rest surface extending in a continuation of the outer circumferential surface of the building drum, are engaged with the building drum, each in axially approached relationship with one of said halves;
wherein each auxiliary support member is engaged with the building drum at least at a connecting member carried by the building drum, wherein each connecting member is in the form of a cylindrical sleeve; and
wherein, after engaging each annular anchoring structure and before shaping the at least one carcass ply, auxiliary shaping members separate from the building drum are connected to the building drum by a fastening device operatively carried by a flanged element of each auxiliary shaping member, each auxiliary shaping member being connected at least to a respective one of said connecting members in place of each auxiliary support member, the fastening device comprising a guide sleeve internally defining an engagement seat slidably engaged on a cylindrical surface of the cylindrical sleeve of the respective one of said connecting members, each auxiliary shaping member having a continuous circumferential extension to hermetically seal the carcass sleeve at the annular anchoring structures thereby facilitating radial expansion of the sleeve itself through inflation during the shaping and maintenance of the inflated state following the shaping.

2. The process as claimed in claim 1, wherein the axially opposite end flaps of said at least one carcass ply applied around the outer circumferential surface of the building drum each lie on the circumferential rest surface of a respective auxiliary support member.

3. The process as claimed in claim 1, wherein said auxiliary support members are disengaged from the building drum, before engagement of said annular anchoring structures.

4. The process as claimed in claim 1, wherein, before engagement of said annular anchoring structures, the end flaps of said at least one carcass ply are folded down toward a geometric axis of the building drum.

5. The process as claimed in claim 1, wherein, before shaping the at least one carcass ply, the auxiliary shaping members are operatively engaged with the building drum, each of the auxiliary shaping members being in axially approached relationship with one of said halves.

6. The process as claimed in claim 5, wherein locking said at least one carcass ply relative to said annular anchoring structures is carried out concurrently with engagement of said auxiliary shaping members to the building drum.

7. The process as claimed in claim 1, wherein engagement of each auxiliary shaping member to the building drum comprises fastening a flanged element of the auxiliary shaping member relative to the building drum and pushing a sealing ring of the auxiliary shaping member against the respective annular anchoring structure.

8. The process as claimed in claim 1, wherein at least said carcass ply is made by laying of elementary components on the building drum.

9. The process as claimed in claim 1, wherein application of said at least one carcass ply comprises applying a plurality of strip-like elements disposed in succession along a circumferential extension of an outer circumferential surface of the building drum.

10. The process as claimed in claim 1, wherein said application diameter is between about 102% and about 120% of the fitting diameter.

11. The process as claimed in claim 1, wherein the application diameter is between about 30% and 90% of an inner diameter of said outer sleeve.

12. The process as claimed in claim 1, wherein a difference between the application diameter and the fitting diameter is in a range of about 2% to about 70% of a difference between an inner diameter of said outer sleeve and the fitting diameter.

13. The process as claimed in claim 1, wherein the application diameter is between about 50% and 80% of an inner diameter of said outer sleeve.

14. The process as claimed in claim 1, wherein engaging an annular anchoring structure comprises:
fitting the annular anchoring structure coaxially around a respective end flap of said at least one carcass ply; and
turning up the end flap of said at least one carcass ply around a respective annular anchoring structure.

15. The process as claimed in claim 1, wherein said shaping said at least one carcass ply into a toroidal configuration is concurrent with mutual approaching of halves of the building drum.

16. The process as claimed in claim 15, wherein shaping said at least one carcass ply is carried out after formation of the sidewalls on the carcass sleeve.

17. The process as claimed in claim 1, wherein:
said outer sleeve comprises at least one belt structure and a tread band;
the tread band has a central portion made by laying at least one second continuous elongated element in the form of coils, disposed in approached relationship, at a radially external position around said belt structure; and
said tread band has axially external end portions each made by laying of at least one third continuous elongated element having a same composition as said at least one first continuous elongated element used for manufacturing respective sidewalls.

18. The process as claimed in claim 17, wherein said axially external end portions are coupled to the central portion of the tread band according to coupling outlines mutually converging away from a geometric axis of the tyre.

19. The process as claimed in claim 18, wherein after shaping of said at least one carcass ply is completed, the coupling outlines mutually converge away from the geometric axis of the tyre symmetrically with respect to an equatorial plane of the tyre.

20. The process as claimed in claim 17, wherein said at least one third continuous elongated element is at least partly laid on an outer surface of an auxiliary drum having a substantially cylindrical outline.

21. The process as claimed in claim 17, wherein the sidewalls each bring a radially external apex thereof in thrust relationship against one of the axially external end portions of the tread band, concurrently with mutual approaching of the halves of the building drum.

* * * * *